US005117401A

United States Patent [19]

Feintuch

[11] Patent Number: 5,117,401

[45] Date of Patent: May 26, 1992

[54] ACTIVE ADAPTIVE NOISE CANCELLER WITHOUT TRAINING MODE

[75] Inventor: Paul L. Feintuch, Covina, Calif.

[73] Assignee: Hughes Aircraft Company, Los Angeles, Calif.

[21] Appl. No.: 568,289

[22] Filed: Aug. 16, 1990

[51] Int. Cl.[5] .............................................. H04B 15/00

[52] U.S. Cl. .................................. 367/135; 367/901; 367/137; 367/1; 381/71

[58] Field of Search .................. 367/901, 137, 1, 135; 381/71, 94; 364/574, 724.19; 181/206

[56] References Cited

U.S. PATENT DOCUMENTS 4,677,676 6/1987 Erikasson ............................ 381/71
4,677,677 6/1987 Eriksson .............................. 381/71
4,736,431 4/1988 Allie et al. .......................... 381/71

*Primary Examiner*—Daniel T. Pihulic
*Attorney, Agent, or Firm*—Wanda K. Denson-Low

[57] ABSTRACT

An active adaptive noise canceller that inserts delays in the weight update logic of an adaptive filter employed by the canceller to make the filter stable. It has been found that there is a great deal of flexibility regarding the selection of the delay values. This insensitivity permits designing the delays in advance, and not having to adjust them to different situations as they change, thus no longer requiring a training mode. The canceller dramatically reduces the amount of hardward needed to perform active adaptive noise cancelling, and eliminates the need for the training mode, which in some applications, including automobiles, for example, can be as objectionable as the noise sources that are to be suppressed.

10 Claims, 2 Drawing Sheets

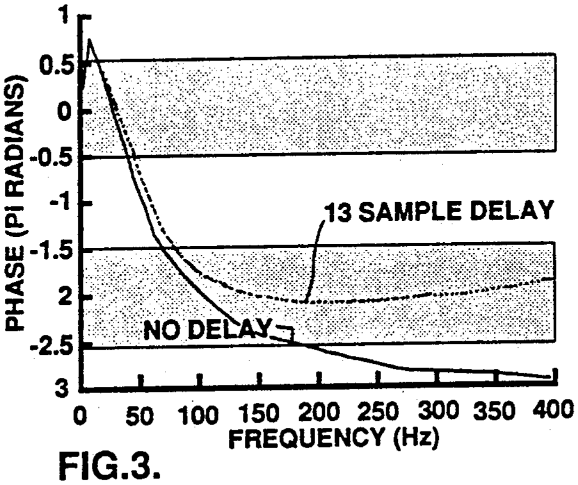
FIG.3.
FIG. 5.
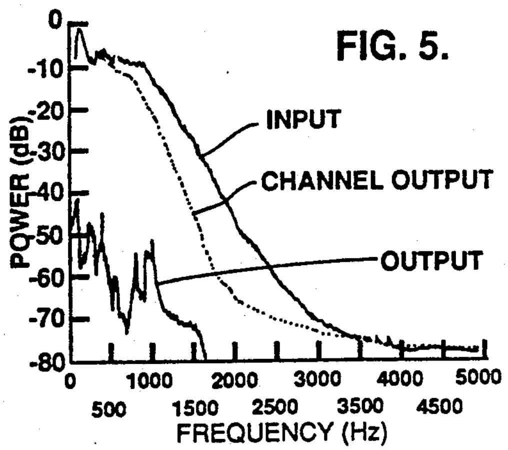
FIG. 6.
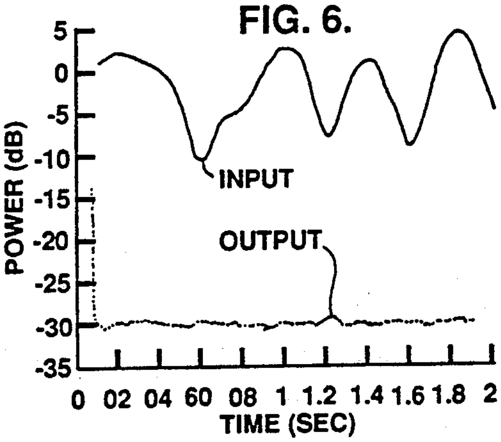
FIG. 7.
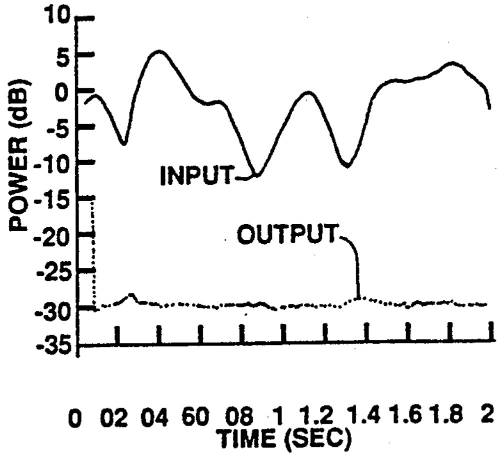
FIG. 8.
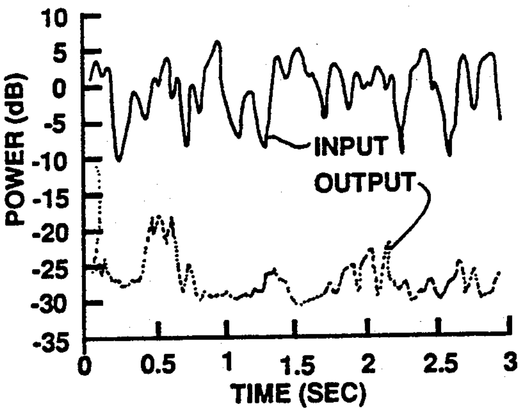
FIG. 9.
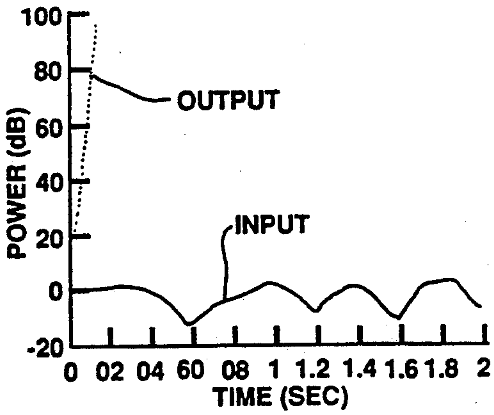

ACTIVE ADAPTIVE NOISE CANCELLER WITHOUT TRAINING MODE

BACKGROUND

The present invention relates generally to adaptive noise cancellers, and more particularly, to active adaptive noise cancellers that do not require a training mode.

Current active adaptive noise cancellation systems use the so called "filtered-X LMS" algorithm, and require that a potentially very objectionable training mode be used to learn the transfer function of a speaker and microphone employed in the systems.

All previously known active noise cancellers utilize the training mode to learn the transfer functions of the speakers and microphones used in their systems. As the physical situation changes, training must be redone. For example, in an automobile application, the training mode needs to be re-initiated every time a window is opened, or another passenger enters the car, or when the vehicle heats up during the day.

By way of introduction, the objective in active noise cancellation is to generate a waveform that inverts a nuisance noise source and suppresses it at some point in space. This is termed active noise cancelling because energy is added to the physical situation. In conventional noise cancelling applications, such as echo cancelling, sidelobe cancelling, and channel equalization, a measured reference is transformed to subtract out from a primary waveform. In active noise cancelling, a waveform is generated for subtraction, and the subtraction is performed acoustically rather than electrically.

In the most basic active noise cancellation system, a noise source is measured with a local sensor such as an accelerometer or microphone. The noise propagates both acoustically and structurally to a point in space, such as the location of the microphone, at which the objective is to remove the components due to the noise source.

The measured noise waveform at its source is the input to an adaptive filter, the output of which drives the speaker. The microphone measures the sum of the actual noise source and speaker output that have propagated to the point where the microphone is located. This serves as the error waveform for updating the adaptive filter. The adaptive filter changes its weights as it iterates in time to produce a speaker output that at the microphone that looks as much as possible (in the minimum mean squared error sense) like the inverse of the noise at that point is space. Thus, in driving the error waveform to have minimum power, the adaptive filter removes the noise by driving the speaker to invert it. Thus the term active cancellation.

In conventional applications of adaptive cancellation, the input to the adaptive filter is called the reference waveform. The filter output is electrically subtracted from the desired waveform channel (called the primary waveform) which is corrupted by the noise to be removed. The difference (called the error) is directly observable and is fed back to update the adaptive filter using a product of the error and the data into the adaptive filter in an LMS weight update algorithm.

Although the error summation in an active cancellation system is performed acoustically in the medium, it is possible to represent this system by an equivalent electrical model. The adaptive filter output is passed through the speaker transferer function and is then subtracted from the channel output to form the error which is observable only through the microphone transfer function. Thus the observable error is not directly based on the adaptive filter output, but on the adaptive filter output passed through the speaker transfer function. In addition, the error difference is not directly observable, but is only observable through the microphone transfer function. Therefore, there are two major structural differences between the active noise cancelling problem and conventional adaptive cancellation. Direct application of the LMS algorithm within this configuration results in filter instability, which is clearly unacceptable. For that reason, all active noise cancelling applications utilize the "filtered-X" LMS algorithm instead, which requires a training mode.

In the training mode the transfer function of the speaker-microphone combination is estimated. A broadband noise source (different from the noise sources described above) is input to both the speaker and a separate adaptive filter that is different from the one used for adaptive cancellation (this filter does not drive the filter and its output is not used at all). The microphone output is then subtracted from the adaptive filter output to form the error waveform which updates the filter. The adaptive filter attempts to make its output look like the speaker-microphone output, thus estimating the cascaded transfer functions. The adaptive filter is updated with the straight LMS algorithm, in that the adaptive filter output is directly subtracted from the waveform it is trying to estimate (the output of the speaker-microphone), and the error for updating the LMS algorithm is directly observable as well. The converged adaptive filter in steadystate has a transfer function denoted by G(SM), which will have been learned in the training mode. The filter G(SM) is then used in the filtered-X configuration to compensate for the speaker and microphone effects.

An adaptive filter employing the filtered-X LMS algorithm uses two adaptive filters, one of which is slaved to the other. The first adaptive filter is used only to form the weights that are used in the slaved filter. The output of the first adaptive filter is not used. The first adaptive filter has its input filtered by the estimated speaker-microphone transfer function, G(SM), which was learned during the training mode. Thus the slave adaptive filter update is based on the filtered data, rather than the data itself, and the error, which is not the direct subtraction of the filter output from the waveform channel output. Since the filter input (reference waveform) is often called the X-channel in adaptive filter literature, this configuration is called the "Filtered-X LMS" algorithm. This algorithm is discussed in the book entitled "Adaptive Signal Processing," by B. Widrow et al, Prentice-Hall, 1985.

In addition, if the microphone appears in both the waveform channel and speaker portions of the circuit prior to error subtraction, if the speaker or microphone contain zeros (which they very likely will), or if the waveform channel or microphone contain poles (which is also very likely), then the adaptive filter will have to produce poles to either undo the speaker-microphone zeros or to transform the noise to model the waveform channel-microphone poles. The limitation here is in the basic finite-impulse-response (FIR) structure of the LMS adaptive filter, which produces only zeros. The LMS adaptive filter can approximate a pole by having a large number of weights, but this results in slow convergence (a severe limitation in practical applications) and is expensive. Thus the need exists to modify the LMS algorithm configuration to adjust its weights based on something other than the error-data product since that is not available, and to produce poles, or remove the need to produce poles.

If in the filtered-X LMS algorithm, G(SM) is made part of the noise source measurement, $G(SM)^{-1}$ is needed on the slave adaptive filter input so as not to change the situation from that of the just-described filter. The speaker-microphone transfer function, which was estimated to be G(SM) in the training mode, is undone by the equivalent of $G(SM)^{-1}$ in front of the slaved adaptive filter. The zeros of the speaker-microphone will be exactly cancelled by the poles of $G(SM)^{-1}$. This eliminates one of the reasons the adaptive filter needs to produce poles. It does nothing about the poles in either the waveform channel or the microphone. More importantly, it provides the adaptive algorithm with the correlated inputs it needs to converge. The adaptive filter on the actual input data is then slaved to have the weights formed using the filtered-X.

A logical question at this stage is whether an adaptive filter that can produce poles implicitly within its structure would be more appropriate for this problem. A recursive adaptive filter, which has a feed-forward and feed-backward adaptive section produces both poles and zeros. It may be used instead of the adaptive filter first discussed above. The problem is that the recursive adaptive filter needs to be updated by the error, which is the direct difference between the adaptive filter output and the waveform channel output. This is not the case with the active canceller, where the error is only observable through the speaker-microphone. In addition the waveform channel output is modified by the inverse of the speaker transfer function. Thus $G(SM)^{-1}$ is needed to provide the recursive LMS algorithm with the error waveform it requires to properly update the feed-forward and the feed-backward weights. It has been found in simulations, that if $G(SM)^{-1}$ is not inserted, the recursive LMS filter is also unstable. Thus, although the recursive LMS algorithm allows the adaptive filter to produce the required poles, it still requires a training mode to fully implement the algorithm.

Therefore, the primary objective of the invention is to eliminate the need for the training mode, in active adaptive cancellation systems, for both those that can and cannot produce poles. It is also an objective to develop an alternative to estimating the speaker-microphone transfer function and having to invert it in an adaptive canceller. There are several practical motivations for this, aside from the complexity of the system. The training mode is very awkward in many situations. For example, in an automobile noise quieting problem, the car occupants are not going to appreciate an irritating loud white noise in the interest of quieting future noise. In addition, the training mode would need to be re-initiated every time the situation in the vehicle changed in a way that could alter the speaker-microphone transfer function, such as opening a window, adding another passenger, the car heating up in the sun, and so forth. What is needed is an alternative to the training mode that provides the system with the correlations that are needed for the LMS or the recursive adaptive filter algorithm to converge while operating over a wide range of variations in the parameters associated with that alternative. Consequently, there is a need for a new active adaptive canceller system that does not require training, and therefore has much more practical utility.

SUMMARY OF THE INVENTION

In accordance with the principles of the present invention, the present active adaptive noise canceller provides for the use of either LMS or recursive adaptive filters in "conventional" adaptive filter configurations. There is no need for training modes to estimate speaker-microphone transfer functions, or for the use of additional filters as slaved filters required in the "filter-X" LMS configuration, which is used to keep the adaptive filter stable. The filter is made stable instead by the insertion of a delay value in the logic that performs the calculation for the update of the adaptive filter weights. The delay value approximates the delay in the combined speaker-microphone transfer function, without requiring estimation of the entire speaker-microphone transfer function. It has been found that there is a large range of flexibility regarding the selection of the delay value, all of which maintain stability of the adaptive canceller. This insensitivity permits designing the delays in advance to cover the full range of expected variations in almost any application, and not having to adjust them to different situations as they change. As a result, the present noise canceller no longer requires the training mode, which in many applications for human comfort can be as objectionable as the noise sources that the system is installed to suppress. In addition, the present invention dramatically reduces the amount of hardware needed to perform active adaptive noise cancelling, by no longer needing the "filtered-X" configuration with its extra slaved adaptive filters to ensure filter stability.

BRIEF DESCRIPTION OF THE DRAWINGS

The various features and advantages of the present invention may be more readily understood with reference to the following detailed description taken in conjunction with the accompanying drawings, wherein like reference numerals designate like structural elements, and in which:

FIG. 3 shows the "unwrapped" phase response of the system of FIG. 2 with no delay and with a 13 sample delay; FIGS. 5–9 show results of simulations performed on the canceller of the present invention.

DETAILED DESCRIPTION

Figure 1:
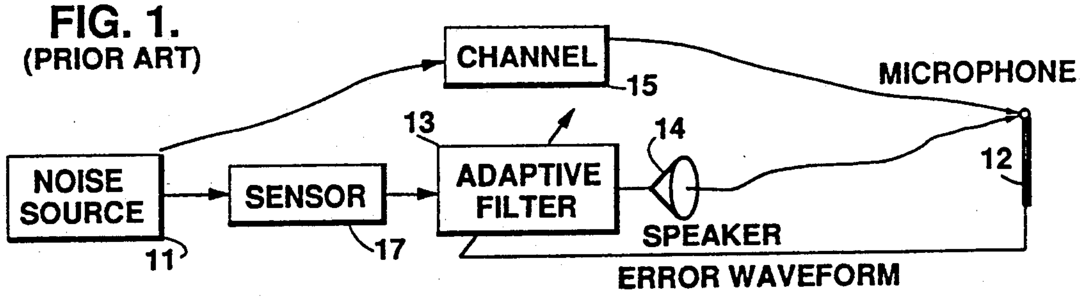
FIG. 1. (PRIOR ART)
FIG. 1 shows a basic prior art adaptive noise canceller configuration.

With reference to FIG. 1, it shows a prior art active noise cancellation system 10. In this basic active noise cancellation system 10, a noise source 11 is measured with a local noise sensor 17 such as an accelerometer or microphone. The noise propagates both acoustically and structurally to a point in space, through what is termed a channel 15, such as the location of the microphone 12, at which the objective is to remove the components due to the noise source 11.

The measured noise waveform at its source is the input to an adaptive filter 13, the output of which drives a speaker 14. The microphone 12 measures the outputs that propagate to the point where the microphone 12 is located. This serves as the error waveform for updating the adaptive filter 13. The adaptive filter 13 changes its weights as it iterates in time to produce a speaker output at the microphone 12 that looks as much as possible (in the minimum mean squared error sense) like the inverse of the noise at that point in space. Thus, in driving the error waveform to have minimum power, the system 10 removes the noise at the microphone 12 by driving the speaker 14 to invert it.

Figure 2:
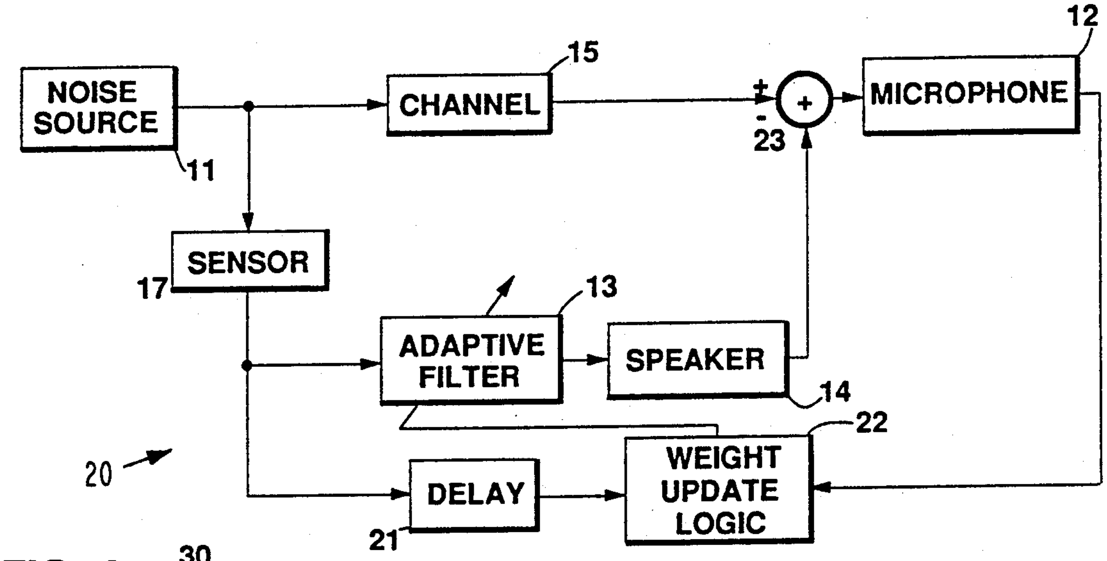
FIG. 2 shows a generalized active adaptive noise canceller in accordance with the principles of the present invention that does not require a training mode.

In order to overcome the limitations of conventional noise canceller systems such as those using the last mentioned principles, FIG. 2 shows a generalized active adaptive noise canceller 20 in accordance with the principles of the present invention that does not require a training mode. The active adaptive noise canceller 20 comprises a sensor, such as a microphone 12, that senses outputs of the speaker 14 and the channel 15. Output signals from the microphone 12 are coupled to weight update logic 22 which is a portion of the adaptive filter 13. Noise from the noise source 11 is sensed by the sensor 17 and coupled as an input to the adaptive filter 13 and to a delay means 21, whose output is coupled to the weight update logic 22. The output of the weight update logic 22 is adaptive to drive the adaptive filter 13 whose output is coupled to the speaker 15. The output of the speaker 14 and channel 15 are summed in an adder 23 as shown in the electrical equivalent circuit of FIG. 2, but are really combined acoustically by the microphone 12 in actual operation of the canceller 20. The use of the delay means 21 renders the system 20 of FIG. 2 stable. Simulations that will be discussed below indicate that a wide range of delay values may be employed in the delay means 21 while keeping the canceller 20 stable.

The principle exploited in the present invention is that the instability of the conventional adaptive canceller for applications of active noise cancellation, is due to its inability to compensate for the phase shifts due to the speaker 14 and microphone 12 transfer functions. The canceller 20 is stable if the weight update logic 22 for the adaptive filter 13 includes the delay means 21 on the data portion of the weight update calculation. A large range of values of this delay, encompassing the full range expected in practice for any particular application, provides a stable canceller 20, so that it need not be trained as in the filtered-X canceller. This property holds for either a finite-impulse-response (FIR) filter as used in LMS adaptive cancellers, or for the infinite-impulse-response (IIR) or recursive adaptive filter cancellers, as will be discussed in more detail below.

Results of simulations are presented herein that demonstrate the behavior of the canceller 20 present invention. The simulations show that adaptive filters are unstable without the delays, and are stable with the inclusion of the delay means 21 in the adaptive filter 13 in accordance with the principles of the present invention. In addition the simulations show that one need not know the exact delay value to ensure stability, but that a large range of values suffice. This robust character with respect to the critical element of the present invention is what enables the removal of the training mode.

The condition for stability requires that the phase of the product of the speaker-microphone transfer function fall inside the regions between $2n\pi-\pi/2$ and $2n\pi+\pi/2$ for $n=0, \pm1, \pm2$, and so on. The simulations show that the insertion of the delay 21 on the data portion of the weight update extends the portions of the spectrum over which this stability condition is met. If the input is bandpass filtered to the portion of the band over which cancellation is desired, then the addition of the delay 21 permits stability over that band by significantly expanding the stability region. Without the delay 21, the canceller 20 is not stable. The simulations show this behavior, for both finite impulse response (FIR) LMS configurations of the canceller 20, and for infinite impulse response (IIR) or recursive implementations of the canceller 20.

It is important to note that if the adaptive filter 13 needs to produce poles, then the LMS algorithm can only approximate the pole by having a large number of filter taps. The recursive filter can actually make poles in its response, and can therefore provide a better steady state solution, i.e. more cancellation, with fewer taps. However, an important aspect of the present invention is not whether poles are needed in the final transfer function of the adaptive filter 13, but that the filter 13 must be stable in order to converge to its steady state solution, whether it needs poles or not. The present invention allows use of FIR or IIR adaptive filters 13 in simple canceller configurations by making them stable via the insertion of the delays in the weight updates.

FIG. 3 is a graph that illustrates the stability region of the canceller 20 of FIG. 2, having phase in pi radians along the ordinate and frequency in Hertz along the abscissa. FIG. 3 shows the "unwrapped" phase response of the canceller 20 of FIG. 2 with no delay and with a 13 sample delay. FIG. 3 is also illustrative of the properties of various filter configurations in which the principles of the present invention may be employed. These will be discussed in more detail below.

A computer model was developed to investigate the active noise cancellation system shown in FIG. 2. The purpose of the model was to demonstrate canceller stability. For simplicity, the signal processing computations of the model were implemented in the digital discrete-time domain. Since the transfer functions of the speaker 14 and microphone 12 are critical in determining stability, special care was taken to preserve the frequency response characteristics of these analog functions when mapped into their discrete-time equivalences.

A speaker transfer function was selected. The amplitude and phase response functions of the speaker are such that the speaker frequency response is limited to the approximate band of 50 to 3000 Hz. This is a reasonable model of a typical inexpensive small speaker. In a similar manner, a simple sixth order bandpass Butterworth filter was used to model the microphone 12.

The next step was to determine the values of the delay to be inserted for stability. The combined phases of the speaker 14 and microphone 12 (with many $2\pi$ discontinuities) must be "unwrapped" to yield a continuous function of frequency. The solid line in FIG. 3 shows the effect of the unwrapping on the phase characteristic of the speaker-microphone combination with no delay. The stability condition requires the unwrapped phase of the speaker-microphone transfer function to fall inside $(2n\pi-\pi/2, 2n\pi+\pi/2)$, $n=0, \pm1, \pm2, \ldots$, which are the stippled regions in FIG. 3. The dashed curve in FIG. 3 is the unwrapped phase with a delay value of 13 samples. The solid curve in FIG. 3 displays stability regions from approximately DC to 4.25 Hz, from 25 to 45 Hz, and from 100 to 170 Hz.

A bulk delay has a phase response that is a straight line with slope proportional to the delay. Thus, there is a limited range of frequencies for which the bulk delay can stabilize the composite phase response of the canceller 20. Therefore, there are phase characteristics where the stability condition can never be achieved with just the insertion of bulk delay. For the example shown in FIG. 3, no delay value yields algorithm stability in the band 40 to 70 Hz. On the other hand, with delays, stability is extended to the frequency region far above 170 Hz.

It was also investigated whether the range of delay values for which the recursive LMS adaptive noise canceller 20 is effective is sufficiently large to encompass physical changes that one would expect in a typical application. If the range is sufficiently large, then one delay value in the middle of this range may be selected, and the need for the training mode is removed. The following simulation results show a remarkable flexibility in the selection of the delay value. It was found that for an input signal containing a tone as well as broadband noise, with the tone at −3 dB, in that it contains half the input power, the canceller response drops to −25 dB in less than 0.1 second.

The significant feature of the canceller 20 and simulation examples presented herein is that in no case was a training mode employed. The delay means 21 was employed to update the weights of the adaptive filter 13. In addition, the delay value may be varied over as many as four time samples without changing the basic performance of the system 20, which provides good, stable cancellation.

It can be concluded that the present invention, using recursive adaptive filters that produce poles and zeros, may be used to provide rapid, stable and significant cancellation without a training mode if the delay means 21 are inserted in the data channels that are used to form the weight updates for the adaptive filter 13.

Figure 4:
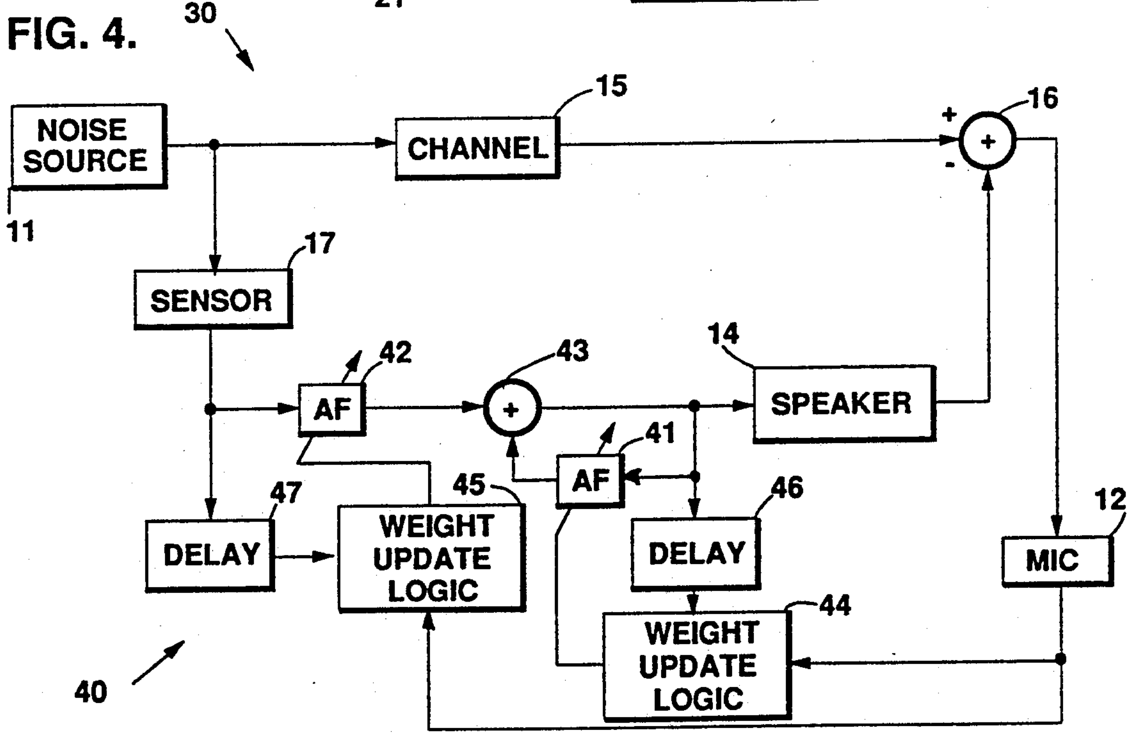
FIG. 4 shows a recursive active adaptive noise canceller in accordance with the principles of the present invention that does not require a training mode employing delays in the weight update logic.

With reference to FIG. 4, it shows an electrical equivalent circuit of a noise cancellation system 30 that includes a recursive LMS adaptive canceller 40 in accordance with the principles of the present invention. The system 30 comprises the channel 15 (typically air) that is the transmission path for noise, and the speaker 14. Adder 16 represents the summation of the acoustic output of the speaker 14 and the noise transmitted by way of the noise propagation channel 15. The combined signal (shown as the output of the adder 16) is sensed by the microphone 12. The output of the microphone 12 provides inputs to the recursive LMS adaptive canceller 40 of the present invention.

The canceller 40 includes first and second LMS adaptive filters 41, 42 whose respective outputs are coupled to inputs of an adder 43, whose output is coupled to the input of the speaker 14, and which comprises the output of the canceller 40. The error feedback inputs to the canceller 40 provided by the microphone 12 are coupled to first and second weight update logic circuits 44, 45, and the outputs of the first and second weight update logic circuits 44, 45 provide weight values for the first and second adaptive filters 41, 42, respectively. The input to the speaker 14 (that is, the output of adder 43) is also coupled as an input to the first adaptive filter 41 and is coupled through a first delay 46 to the first weight update logic circuit 44. The signal from the noise source 11 is coupled through the sensor 17 as a signal input to the second adaptive filter 42 and is coupled a second delay 47 to the second weight update logic circuit. as an input to the second adaptive filter 42, and is coupled through a second delay 47 to the second weight update logic circuit 45.

The recursive LMS adaptive noise canceller 40 of the present invention adds the delays 46, 47 in the data path of a conventional recursive LMS filter. The delays 46, 47 provide inputs to the weight update logic circuits 44, 45 that compute the adaptive filter weights. The delay values that are chosen approximately compensate for the delay that the speaker-microphone transfer function places on the error path. The innovation provided by the present invention is the use of the delays 46, 47 to delay the inputs to the weight update logic circuits 45, 46. In the recursive adaptive canceller 40 in FIG. 3, the updates to the feed-forward and feed-backward weights use delayed data sequences, rather than undelayed values. The use of undelayed values as updates to the feed-forward and feed-back weight is described in the article entitled "An Adaptive Recursive LMS Filter," by P. L. Feintuch, *IEEE Proceedings*, Vol. 64, No. 11, November 1976. Without the use of the delays 46, 47, the active cancellation system 30 is unstable. With delays that are near the values of the delays caused by the speaker 14 and microphone 12, the system 30 is stable. The recursive LMS adaptive noise canceller 40 then corrects for spectral transformations that are needed.

With regard to the above-mentioned simulations, presented below are results of simulations for specific canceller types incorporating the principles of the present invention. These canceller types include infinite impulse response (IIR) recursive adaptive filters and the finite impulse response (FIR) LMS adaptive filters.

Using the LMS adaptive filter structure shown in FIG. 2, the filter is unstable with a delay value of zero, but is stable for 6 units of delay in both the feed-forward and feed-backward weight updates. FIG. 5 shows a power versus frequency graph for the case of any input to the canceller 20 consisting of broadband noise and a −3 dB tone at 100 Hz. The top trace is the power spectrum of the channel input. In this case there is no additional additive noise, so the middle trace is the channel output, and the lower trace is the canceller output. Note that the canceller 20 is stable and achieves in excess of 40 dB of suppression.

For example, suppose it is desired to operate the canceller 20 in the band from 170 to 400 Hz. Without delay, the LMS canceller is unstable. However, from FIG. 3, there exists a range of delays which adequately equalize the phase response for in-band stability. It is easy to show that stability is achieved with delay values ranging from 0.6 to 1.7 milliseconds. This range of values achieves stability with a broad range of delays. For a sampling frequency of 10 k Hz (used in the computer model), the delays correspond to from 6 to 17 sample delays. Insertion of the 13 sample delay has provided sufficient bending and leveling of the phase response of the speaker-microphone transfer function to extend the stability region to the band 170 Hz to 600 Hz.

Simulations of the filter using random inputs are also presented to support these analytical performance predictions. In the simulations, a 6-tap low pass FIR filter represented the acoustic channel through which the signal passed, modelling simple multipath propagation. White Gaussian noise was added to the output of this filter to represent the ambient background. Many simulation cases have been made using this model, encompassing ensembles of the noise processes as well as the full range of added delay values. Some typical sample cases are presented below with reference to FIGS. 6–10. The signals were modelled as a single frequency carrier, modulated with narrow-band random processes of different bandwidths and modulations. The ambient noise levels were set at −30 dB below the signal levels. The solid lines in these figures represent the channel output power while the dashed lines represent the cancelled output power.

The bandwidth of the input narrowband process and center frequency was set at 5 Hz and 200 Hz, respectively, in the first sample run shown in FIG. 6. A 64 tap FIR filter configuration is used with adaptation constant of $10^{-3}$. Rapid convergence of the error waveform to the noise floor was achieved in less than 0.1 second. The parameters of the second sample run shown in FIG. 7 were identical to the first run except the center frequency of the narrowband process was modulated linearly in time at a rate of 50 Hz/sec. Almost identical convergence characteristics were achieved in the second run.

The input signal waveform parameters in the next case shown in FIG. 8 was as in the first two cases except the bandwidth of the narrowband process is increased to 20 Hz. The adaptation constant and filter tap size were changed to $4\times10^{-4}$ and 128, respectively, for better cancellation performance. This also demonstrates successful adaptive removal of the unwanted signals down to the level of the background noise. However, due to the broader bandwidths of the signals to be cancelled, the adaptive filter converged more slowly than in the first two runs. Nevertheless, significant (20 dB or more) cancellation was achieved in less than one second for both cases.

Finally, in the last sample run shown in FIG. 9, the signal parameters are the same as in the first run except the filter is updated with only 5 units of delay. Instead of dropping to the −30 dB noise floor as in the previous cases, the canceller output power grows rapidly without bound, indicating that the LMS algorithm becomes unstable with a 5 sample delay as theory predicts. The adaptation constants and adaptive filter tap sizes were varied for this delay value. All variations have resulted in algorithm instability. Thus the simulations have supported the analytical prediction that the canceller is unstable for delays less than 5 samples, and that there is a large range of delays (from 6 to 17) for which the algorithm is stable.

Thus there has been described new and improved active adaptive noise cancellers that do not require a training mode. It is to be understood that the above-described embodiment is merely illustrative of some of the many specific embodiments which represent applications of the principles of the present invention. Clearly, numerous and other arrangements can be readily devised by those skilled in the art without departing from the scope of the invention.

What is claimed is:

1. An active adaptive canceller for use in suppressing noise signals derived from a noise source, said active adaptive canceller comprising:

a noise sensor;

an acoustic sensor;

an acoustic output device;

delay means coupled to the noise sensor for delaying the noise signals generated thereby by a preselected time delay; and adaptive filter means having a plurality of inputs coupled to the noise sensor, the acoustic sensor, and the delay means, and an output coupled to the acoustic output device;

wherein the delay means causes the active adaptive canceller to be stable and to not require a training mode.

2. The active adaptive canceller of claim 1 wherein the adaptive filter means comprises a plurality of adjustable filter weight inputs, and weight update logic circuitry coupled to the plurality of adjustable filter weight inputs and to the delay means for receiving output signals from the acoustic sensor and delayed output signals from the delay means and for adjusting the filter weights applied to the adjustable filter weight inputs.

3. The active adaptive canceller of claim 1 wherein the adaptive filter means and delay means comprises:

first adaptive filter means having an input and an output;

second adaptive filter means having an input and an output;

adder means coupled to the outputs of the first and second adaptive filter means for combining the output signals provided thereby to provide filtered output signals and for applying the filtered output signals to the output device;

first delay means coupled to the first adaptive filter means for delaying the filtered output signals coupled thereto by a first predetermined time delay; and second delay means coupled to the second adaptive filter means for delaying the noise signals coupled thereto by a second predetermined time delay.

4. The active adaptive canceller of claim 3 wherein the first and second predetermined time delays are substantially the same.

5. The active adaptive canceller of claim 1 wherein the adaptive filter means and delay means comprises:

first adaptive filter means having an input and an output and including a plurality of adjustable filter weight inputs;

second adaptive filter means having an input and an output and including a plurality of adjustable filter weight inputs;

adder means coupled to the outputs of the first and second adaptive filter means for combining the output signals provided thereby to provide filtered output signals and for applying the filtered output signals to the output device;

first weight update logic circuitry coupled to the first adaptive filter means for receiving input signals comprising the filtered output signals and output signals from the acoustic sensor and for adjusting the filter weights applied to the adjustable filter weight inputs of the first adaptive filter means;

second weight update logic circuitry coupled to the second adaptive filter means for receiving input signals comprising the background noise signals and output signals from the acoustic sensor and for adjusting the filter weights applied to the adjustable filter weight inputs of the second adaptive filter means;

first delay means coupled to the first weight update logic circuitry for delaying the filtered output signals coupled to the first weight update logic circuitry by a predetermined time delay; and second delay means coupled to the second weight update logic circuitry for delaying the background noise signals coupled to the second weight update logic circuitry by a predetermined time delay.

6. An active adaptive canceller for use in suppressing noise signals derived from a noise source, said active adaptive canceller comprising:

a noise sensor adapted to sense the noise signals;

an acoustic sensor;

an acoustic output device;

an adaptive filter coupled between the noise sensor and the acoustic output device;

delay means coupled to the noise sensor for delaying the noise signals generated thereby by a preselected time delay; and weight update logic circuitry coupled between the the adaptive filter means and the delay means for receiving output signals from the acoustic sensor and delayed output signals from the delay means and for adjusting the filter weights applied to the adjustable filter weight inputs of the adaptive filter;

wherein the delay means causes the active adaptive canceller to be stable and to not require a training mode.

7. An adaptive canceller for use in eliminating noise from a system comprising a noise sensor, a speaker and an microphone that function in the presence of background noise signals, said adaptive canceller comprising:

a first adaptive filter having an input and an output and including a plurality of adjustable filter weight inputs;

a second adaptive filter having an input and an output and including a plurality of adjustable filter weight inputs;

means for combining the output signals provided by the first and second adaptive filters to provide filtered output signals and for applying the filtered output signals to the speaker;

first weight update logic circuitry coupled to the first adaptive filter for receiving input signals comprising the filtered output signals and output signals from the microphone and for adjusting the filter weights applied to the adjustable filter weight inputs of the first adaptive filter;

second weight update logic circuitry coupled to the second adaptive filter for receiving input signals comprising the background noise signals and output signals from the microphone and for adjusting the filter weights applied to the adjustable filter weight inputs of the second adaptive filter;

a first delay circuit coupled to the first weight update logic circuitry for delaying the filtered output signals coupled to the first weight update logic circuitry by a predetermined time delay; and a second delay circuit coupled to the second weight update logic circuitry for delaying the background noise signals coupled to the second weight update logic circuitry by a predetermined time delay.

8. An adaptive canceller for use in eliminating noise from a system comprising a noise sensor, a speaker and a microphone that function in the presence of background noise signals, said adaptive canceller comprising:

first adaptive filter means having an input and an output and including a plurality of adjustable filter weight inputs;

second adaptive filter means having an input and an output and including a plurality of adjustable filter weight inputs;

adder means coupled to the outputs of the first and second adaptive filter means for combining the output signals provided thereby to provide filtered output signals and for applying the filtered output signals to the speaker;

first weight update logic circuitry coupled to the first adaptive filter means for receiving input signals comprising the filtered output signals and output signals from the microphone and for adjusting the filter weights applied to the adjustable filter weight inputs of the first adaptive filter means;

second weight update logic circuitry coupled to the second adaptive filter means for receiving input signals comprising the background noise signals and output signals from the microphone and for adjusting the filter weights applied to the adjustable filter weight inputs of the second adaptive filter means;

first delay means coupled to the first weight update logic circuitry for temporally delaying the filtered output signals coupled to the first weight update logic circuitry by a predetermined fixed time delay; and second delay means coupled to the second weight update logic circuitry for temporally delaying the background noise signals coupled to the second weight update logic circuitry by a predetermined fixed time delay.

9. An active adaptive canceller for use in suppressing acoustic noise signals generated by an acoustic noise source, said active adaptive canceller comprising:

a first sensor for receiving said noise signals and providing a signal representative of said noise signals;

an output device for generating acoustic cancelling signals for cancelling said acoustic noise signals;

a second sensor for receiving the acoustic noise signals and said acoustic cancelling signals to provide combined acoustic signals;

a delay means for delaying the signals representative of said noise signals by a preselected time delay to provide delayed signals representative of said noise signals, said time related to the combined delay attributed to the transfer function of the output device and the second sensor; and an adaptive filter having its signal input coupled to receive said signals representative of said noise signals, said adaptive filter having its weight update logic coupled to receive the delayed signals representative of said noise signals and the output of said second sensor, the output of said adaptive filter coupled to said output device.

10. An active adaptive canceller as recited in claim 9 further including a second delay means for delaying signals at its input by a preselected time delay to provide delayed signals at its output, said time of the delay related to the combined delay of the transfer function of the output device and the second sensor; and wherein said adaptive filter comprises:

a first adaptive filter;

a second adaptive filter; and an adder having at least two inputs and an output;

the second adaptive filter having its signal input coupled to receive said signals representative of said noise signals, said adaptive filter having its weight update logic coupled to receive the delayed signals representative of said noise signals and the output of said second sensor to receive, the output of said second adaptive filter coupled to one input of said adder;

the output of said adder coupled to said output device and to the input of said second delay means;

the first adaptive filter having its signal input coupled to receive the output of said adder, said first adaptive filter having its weight update logic coupled to receive the output of said second delay means and the output of said second sensor.

* * * * *